United States Patent
Kang et al.

(10) Patent No.: US 8,303,681 B2
(45) Date of Patent: Nov. 6, 2012

(54) MIXED POWDER AND SINTERED BODY, MIXED CERMET POWDER AND CERMET, AND FABRICATION METHODS THEREOF

(75) Inventors: Shin-Hoo Kang, Seoul (KR); Jin-Kwan Jung, Cheonan-si (KR); Han-Jung Kwon, Nonsan-si (KR)

(73) Assignee: Seoul National University Industry Foundation, Seoul (KR)

( * ) Notice: Subject to any disclaimer, the term of this patent is extended or adjusted under 35 U.S.C. 154(b) by 627 days.

(21) Appl. No.: 12/376,737

(22) PCT Filed: Aug. 8, 2007

(86) PCT No.: PCT/KR2007/003814
§ 371 (c)(1),
(2), (4) Date: Mar. 17, 2009

(87) PCT Pub. No.: WO2008/018752
PCT Pub. Date: Feb. 14, 2008

(65) Prior Publication Data
US 2010/0184582 A1     Jul. 22, 2010

(30) Foreign Application Priority Data

Aug. 8, 2006 (KR) .................. 10-2006-0074446
Feb. 21, 2007 (KR) .................. 10-2007-0017564

(51) Int. Cl.
*C22C 29/02* (2006.01)
(52) U.S. Cl. ................ 75/236; 75/238; 75/242; 75/244; 419/14; 419/15; 501/87; 501/96.1
(58) Field of Classification Search .................. 75/236, 75/238, 242, 244; 501/87, 96.1; 419/14, 419/15
See application file for complete search history.

(56) References Cited

U.S. PATENT DOCUMENTS
3,488,291 A * 1/1970 Hardy et al. .................. 252/642
(Continued)

FOREIGN PATENT DOCUMENTS
EP           1714942          10/2006
(Continued)

OTHER PUBLICATIONS

Park, Toughened Ultra-fine (Ti,W) (CN)—Ni cermets, Scripta Materialia 52 (2005) 129-133, Published by Elsevier Ltd., Schools of Materials Science and Engineering, Seould, Republic of Korea.

(Continued)

*Primary Examiner* — Roy King
*Assistant Examiner* — Ngoclan T Mai
(74) *Attorney, Agent, or Firm* — Workman Nydegger

(57) ABSTRACT

A mixed powder and a sintered body obtained by sintering the mixed powder. The mixed powder includes a solid-solution powder with complete solid-solution phase. The solid-solution powder includes a carbide or a carbonitride of at least two metals selected, including Ti, from metals of Groups IVa, Va and VIa of the periodic table, or a mixture thereof. A mixed cermet powder and a cermet obtained by sintering the mixed cermet powder are also disclosed. The mixed cermet powder includes at least a cermet powder with complete solid-solution phase. The cermet powder includes a carbide or a carbonitride of at least two metals selected, including Ti, from metals of Groups IVa, Va and VIa of the periodic table, or a mixture thereof, and at least one metal selected from the group consisting of Ni, Co and Fe. Also disclosed are a sintered body and a fabrication method of a cermet.

6 Claims, 10 Drawing Sheets

U.S. PATENT DOCUMENTS

| | | | |
|---|---|---|---|
| 4,008,090 A * | 2/1977 | Miyake et al. | 501/91 |
| 4,935,057 A * | 6/1990 | Yoshimura et al. | 75/238 |
| 5,580,666 A * | 12/1996 | Dubensky et al. | 428/552 |
| 5,766,742 A | 6/1998 | Nakamura | |
| 6,007,598 A * | 12/1999 | Dunmead et al. | 75/236 |
| 7,211,218 B2 * | 5/2007 | Fang et al | 419/10 |
| 7,892,315 B2 * | 2/2011 | Kang | 75/252 |
| 2005/0047950 A1 * | 3/2005 | Shim et al. | 419/15 |
| 2005/0180875 A1 | 8/2005 | Kang | |

FOREIGN PATENT DOCUMENTS

| | | |
|---|---|---|
| EP | 07807981 | 1/2012 |
| JP | 59-028542 | 2/1984 |
| JP | 59028542 | 2/1984 |
| JP | 63-227739 | 9/1988 |
| JP | 2502322 | 9/1988 |
| KR | 10-1996-0010588 | 3/1998 |
| WO | 2007/148921 | 12/2007 |

OTHER PUBLICATIONS

Park, Synthesis of (Ti, $M_1$, $M_2$)(CN)—Ni nanocrystalline powders, International Journal of Refractory Metals & Hard Materials 24 (2006) 115-121, Published by Elsevier Ltd., School of Materials Science and Engineering, Seoul, Republic of Korea.

\* cited by examiner

MIXED POWDER AND SINTERED BODY, MIXED CERMET POWDER AND CERMET, AND FABRICATION METHODS THEREOF

TECHNICAL FIELD

The present disclosure relates to a ceramic powder, a ceramic obtained by sintering the ceramic powder, a cermet powder, a cermet obtained by sintering the cermet powder, and fabrication methods thereof. More particularly, the present disclosure relates to a ceramic powder, a ceramic obtained by sintering the ceramic powder, a cermet powder, a cermet obtained by sintering the cermet powder, and fabrication methods thereof, which improve general mechanical properties, particularly in terms of toughness and hardness, and can thus be applied in materials for high-speed cutting tools and dies used in mechanical industries, including machinery manufacturing and automotive industries.

BACKGROUND ART

Throughout this specification, nano size refers to a range of 500 nm or smaller, ultra-fine size refers to a range between 500 nm and 1 μm, and micro size refers to a range of 1 μm or greater.

As materials for main cutting tools or wear-resistant tools, which are necessarily used for metal cutting and other processes in mechanical industries, WC-based hard metals, a variety of TiC or Ti(C,N)-based cermets, other ceramics or high speed steels are used. In general, cermets are ceramic-metal composite sintered bodies including hard phases such as TiC and Ti(C,N), and binding phases such as Ni, Co and Fe as main elements. In addition, the cermets further include additives such as carbide, nitride and carbonitride of Group IVa, Va, and VIa metals of the periodic table. That is, cermets are fabricated in such a way that hard ceramic powder and matrix phase metal for binding the hard ceramic powder are mixed together and then the mixture is sintered in a vacuum, nitrogen or hydrogen ambient. Here, the hard ceramic powder includes WC, NbC, TaC, $Mo_2C$, and so on, in addition to TiC and Ti(C,N), and the matrix phase metal includes Co, Ni, etc.

TiC and Ti(C,N) are excellent high strength materials that have been widely applied to various fields. In particular, since TiC has a very high Vickers hardness of 3,200 $kg/m^2$, a very high melting point of 3,150° C. to 3,250° C., relatively favorable anti-oxidation characteristic up to 700° C., and other superior characteristics such as high wear-resistance, high corrosion resistance, good electron radiation, and light-condensing characteristics, TiC and Ti(C,N) have been widely used for high-speed cutting tools as a substitute for WC—Co alloy.

However, in the case of preparing a cermet using TiC, a binding phase metal such as Ni is used as a liquid metal during a sintering process. In this case, since TiC has a larger wetting angle than WC—Co alloy, TiC grains are rapidly grown, leading to a decrease in toughness of TiC. Notwithstanding, Ford Motor Company mass-produced TiC—$Mo_2C$—Ni cermet for the first time in 1956, which did not have enhanced toughness but was used as a material for a high hardness tool for precision machining, particularly, semi-finishing and finishing.

In 1960's and 1970's, to improve the toughness that was a great weakness of the TiC—Ni cermet system, many attempts have been made to add various kinds of elements thereto; however, these attempts did not yield any notable improvements.

In the 1970's, a method for forming Ti(C,N) having a thermodynamically more stable phase by adding TiN to TIC was introduced, improving toughness to some degree. That is, since Ti(C,N) has a finer microstructure than TiC, the toughness of Ti(C,N) can be improved. In addition, Ti(C,N) is advantageous in improving chemical stability, and mechanical impact resistance. In order to improve the toughness, several additive carbides such as WC, $Mo_2C$, TaC, NbC, etc., have been used, and new products in the form of Ti(C,N)-$M_1$C-$M_2$C— . . . —Ni/Co are even now being commercialized.

When applying the additive carbide for improving toughness, it can be observed that a general microstructure of TiC or Ti(C,N)-based cermet has a core/rim structure in which a binding phase metal such as Ni and Co surrounds a hard phase of the core/rim structure. A core of the core/rim structure corresponds to TiC or Ti(C,N) undissolved in a liquefied metal binder (e.g., Ni, Co, etc.) during the sintering process, thus giving it a high hardness. Conversely, a rim surrounding the core corresponds to a solid-solution (this is expressed as (Ti, $M_1$, $M_2$ . . . (C, N))) between the core element (i.e., TiC or Ti(C,N)) and an additive carbide, and has high toughness rather than high hardness. As such, by adopting the rim microstructure surrounding the core, the cermet having the core/rim structure solved the toughness problem to some degree, which was an major weakness of a simple cermet system such as TiC—Ni and Ti(C,N)—Ni.

DISCLOSURE

Technical Problem

In a related art cermet, a volume fraction of a rim phase in a core/rim structure is low so that the related art cermet still has a lower toughness than competitive WC—Co hard metal. Thus, attempts to develop a cermet with improved toughness in which a core/rim structure does not exist or is minimized, have been continually made by Japanese tool makers such as Sumitomo and Kyocera, and European and U.S. researchers.

However, solid-solution phases are formed during a sintering process according to current commercialized technology, and the amount of the solid-solution phases formed depends on a sintering temperature and time. Therefore, it is impossible to obtain a cermet with a complete solid-solution phase. Furthermore, advanced technologies, capable of controlling the amount of the solid-solution phase according to characteristic requirements to attain substantially high toughness using current commercial cermet materials, have not been developed yet.

Technical Solution

The present disclosure provides a powder, a ceramic or a cermet obtained by sintering the powder, and fabrication methods thereof, which can substantially improve the toughness of a TiC or Ti(C,N)-based cermet and prepare a material satisfying characteristic requirements, by using a technology that can control a peripheral microstructure of a core/rim structure in a sintered body of TiC or Ti(C,N)-based composite powder.

According to an exemplary embodiment, a mixed powder includes at least a solid-solution powder with a complete solid-solution phase, wherein the solid-solution powder includes a carbide or a carbonitride of at least two metals selected, including Ti, from metals of Groups IVa, Va and VIa of the periodic table, or a mixture thereof.

In the mixed powder, the solid-solution powder may be prepared by reducing and carburizing or reducing, carburizing and nitriding a metal oxide as a raw material.

According to another exemplary embodiment, a mixed cermet powder includes at least a cermet powder with a complete solid-solution phase, wherein the cermet powder includes: a carbide or a carbonitride of at least two metals selected, including Ti, from metals of Groups IVa, Va and VIa of the periodic table, or a mixture thereof; and at least one metal selected from the group consisting of Ni, Co and Fe.

In the mixed cermet powder, the cermet powder with complete solid-solution phase may be prepared by reducing and carburizing or reducing, carburizing and nitriding a metal oxide as a raw material According to another exemplary embodiment, there are provided a cermet fabricated by sintering the mixed cermet powder and a fabrication method thereof.

This cermet is a mixed cermet powder sintered body including: (i) a commercial cermet powder of TiC—WC—$Mo_2C$—TaC—NbC-Me or Ti (C,N)—WC—$Mo_2C$—TaC—NbC-Me (Me is a binding phase having at least one element selected from the group consisting of Ni, Co and Fe), (ii) a cermet powder with complete solid-solution phase including a carbide or a carbonitride of at least two metals selected, including Ti, from metals of Groups IVa, Va and VIa of the periodic table, or a mixture thereof, and at least one metal selected from the group consisting of Ni, Co and Fe, wherein the cermet powder with complete solid-solution phase may include, for example, (Ti, W, M1, ... )C-Me, (Ti, M1, $M_2$, ... )C-Me, (Ti, W, $M_1$, ... )(CN)-Me, (Ti, W, $M_1$, ... )(CN)-Me (Me is a binding phase including at least one element selected from the group consisting of Ni, Co and Fe). This sintered body may have a Ti(C,N) core in the main.

As illustrated above, the present disclosure provides a mixed powder in which a solid-solution powder with complete solid-solution phase is mixed with a commercial powder, and a mixed cermet powder in which a cermet powder with complete solid-solution phase is mixed with a commercial powder, so that low toughness problem caused by high hardness of TiC or Ti (C,N)-based ceramic or cermet is resolved to thereby improve characteristics remarkably and control microstructures effectively.

According to sill another exemplary embodiment, a cermet includes: a carbide or a carbonitride of at least two metals selected, including Ti, from metals of Groups IVa, Va and VIa of the periodic table, or a mixture thereof; and at least one metal selected from the group consisting of Ni, Co and Fe, wherein a volume fraction of solid-solution phases in a microstructure of a sintered body is 70% or greater as main particles.

According to yet another exemplary embodiment, a method of fabricating a cermet includes: mixing a carbide or a carbonitride of at least two metals selected, including Ti, from metals of Groups IVa, Va and VIa of the periodic table, and at least one metal selected from the group consisting of Ni, Co and Fe; and compacting and sintering the mixed powder. Herein, a volume fraction of solid-solution phases in a microstructure of a sintered body may be 70% or greater as main particles by preparing a carbide or a carbonitrde of at least one metal selected, including Ti, from IVa Group metals of the periodic table, using a raw powder with particle size of 500 nm or smaller.

The fabrication method of the cermet is characterized in that a carbide or a carbonitride of at least one metal selected, including Ti, from IVa Group metals of the periodic table, uses nano-sized powder. A powder of at least one metal selected from the group consisting of Ni, Co and Fe may have micro size or greater. In the fabrication method, nano-sized TiC or Ti(C,N)-based powder exhibiting high hardness characteristic and WC, $Mo_2C$, NbC, TaC, ZrC-based powder are mixed together according to desired composition, and thereafter the mixed powder is sintered. Therefore, a volume fraction of complete solid-solution phases remarkably increases to 70% or greater, which improves toughness of a cermet.

Advantageous Effects

According to a mixed powder partially including a solid-solution powder with a complete solid-solution phase, a ceramic and a cermet obtained by sintering the mixed powder, a mixed cermet powder partially including a cermet powder with a complete solid-solution phase, a cermet obtained by sintering the mixed cermet powder, and fabrication methods thereof of exemplary embodiments, a peripheral region of a core/rim structure can be increased in a microstructure of TiC or Ti(C,N)-based ceramics or cermets.

In addition, when fabricating a cermet using a nano-sized raw powder according to exemplary embodiments, it is possible to substantially improve toughness of the cermet and provide a material adapted for high toughness cutting tools having various microstructures, because the amount of the peripheral region of a core/rim structure is remarkably increased in a TiC or Ti(C,N)-based ceramic or cermet microstructure.

MODE FOR INVENTION

Figure 1:
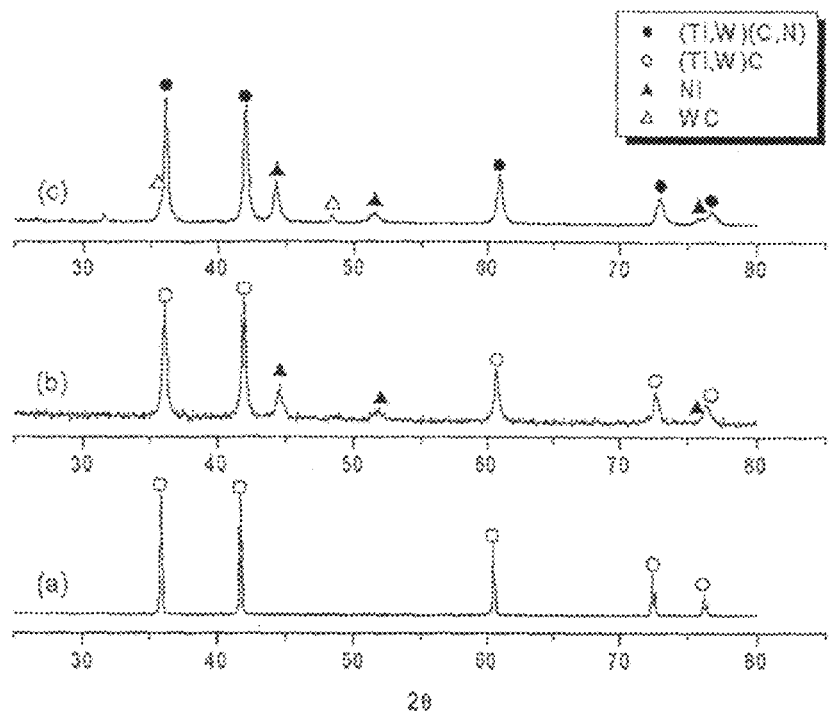
FIGS. 1(a) through 1(c) are X-ray diffraction (XRD) phase analysis results of a solid-solution powder contained in a mixed ceramic powder and a cermet powder contained a mixed cermet powder according to an exemplary embodiment.

Hereinafter, the present invention will be more fully described with reference to the accompanying drawings. The invention may, however, be embodied in many different forms and should not be construed as being limited to the embodiments set forth herein; rather, these embodiments are provided such that this disclosure will be thorough and complete, and will fully convey the concept of the invention to those skilled in the art.

Embodiment 1

The embodiment provides a mixed ceramic powder in which a solid-solution powder with complete solid-solution phase is mixed with a commercial powder. Furthermore, the embodiment provides a mixed cermet powder in which a cermet powder with complete solid-solution phase is mixed with a commercial powder. The solid-solution powder with complete solid-solution and the cermet powder with complete solid-solution phase may be prepared by reducing and carburizing or reducing, carburizing and nitriding a metal oxide as a raw material.

The complete solid-solution phase described herein may have nanocrystallite size of 100 nm or smaller, and the solid-solution powder with compete solid-solution phase and the cermet powder with complete solid-solution phase may employ powders disclosed in Korean Patent Application No. 2004-9859, 2005-38163 and 2005-32533 filed by the present applicant. The previously filed specifications are integrally incorporated into the present specification by reference.

Based on the previously filed specifications, a method of fabricating a solid-solution powder with complete solid-solution phase may include: (P1-1) mixing a metal oxide with a carbon powder or a carbon source according to a desired composition, wherein the metal oxide includes at least two metals selected, including Ti, from metals of Groups IVa, Va and VIa of the periodic table; and (P2) reducing and carburizing the mixed powder where the metal oxide is mixed with the carbon powder or carbon source.

The operation (P1-1) may further include milling the mixed powder where the metal oxides and the carbon powder or carbon source are mixed.

Furthermore, according to the previously filed specifications, a method of fabricating a cermet powder with a complete solid-solution phase may include: (P1-3) mixing (a) an oxide including at least one metal selected from the group consisting of Ni, Co and Fe, (b) another oxide including at least one element selected from metals of Groups IVa, Va, and VIa of the periodic table, and (c) a carbon powder or a carbon source prepared according to a desired composition; and (P2) reducing and carburizing the mixed powder where (a) the oxide, and (b) the other oxide, and (c) the carbon powder or carbon source are mixed together.

The operation (P1-3) includes mixing (a) an oxide including at least one metal selected from the group consisting of Ni, Co and Fe, (b) another oxide including at least two metal selected, including Ti, from metals of Groups IVa, Va, and VIa, and (c) a carbon powder or a carbon source prepared according to a desired composition. In addition, the operation (P1-3) may further include milling the mixed powder where (a) the oxide, and (b) the other oxide, and (c) the carbon powder or carbon source are mixed together.

In addition, according to the previously filed specifications, a method of fabricating a cermet powder with completed solid-solution phase may include: (P1-4) mixing (a) an oxide including at least one micro-sized metal selected from the group consisting of Ni, Co and Fe, (b) another oxide including at least one micro-sized element selected from the group consisting of metals of Groups IVa, Va, and VIa, and (c) a carbon powder or a carbon source prepared according to a desired composition, and milling the mixed powder into nano-sized powders or amorphous phases; and (P2) reducing and carburizing the mixed powder where (a) the oxide, and (b) the other oxide, and (c) the carbon powder or carbon source are mixed together.

The operation (P1-4) includes: mixing (a) an oxide including at least one micro-sized metal selected from the group consisting of Ni, Co and Fe, (b) another oxide including at least two micro-sized elements selected, including Ti, from the group consisting of metals of Groups IVa, Va, and VIa of the periodic table; and (c) a carbon powder or a carbon source prepared according to a desired composition; and milling the mixed powder where (a) the oxide, and (b) the other oxide, and (c) the carbon powder or carbon source are mixed together.

The operation (P2) further includes nitriding the mixed powder in addition to the reducing and carburizing of the mixed powder.

In the operation (P2), the reducing and carburizing of the mixed powder are performed at a temperature ranging from approximately 1,000° C. to approximately 1,500° C. for approximately 3 hours or less in vacuum, hydrogen, $CH_4$, $CO/CO_2$ ambient, and the nitriding of the mixed powder is performed in nitrogen ambient. Herein, the reducing, carburizing and nitriding of the mixed powder are performed at the same time.

A ceramic and cermet with excellent physical properties can be fabricated even when sintering each of the solid-solution powder with a complete solid-solution phase and the cermet powder with a complete solid-solution phase without others added thereto. However, the present inventors have discovered that, in the case where the solid-solution powder with complete solid-solution phase and the cermet powder with complete solid-solution phase are mixed with commercial powders, the low toughness problem due to high hardness of TiC or Ti(C,N)-based ceramic and cermet could be resolved, material properties could be remarkably enhanced, and microstructures could be effectively controlled.

Therefore, a mixed powder described in the embodiment includes at least a solid-solution powder with a complete solid-solution phase. Herein, the solid-solution powder with a complete solid-solution phase includes a carbide or a carbonitride of at least two metals selected, including Ti, from metals of Groups IVa, Va and VIa of the periodic table, or a mixture thereof.

This mixed powder may be a mixed ceramic powder including: (i) a powder including a carbide or a carbonitride of at least one metal selected from metals of Groups IVa, Va and VIa of the periodic table, or a mixture thereof; and (ii) a solid-solution powder with complete solid-solution phase including a carbide or a carbonitride of at least two metals selected, including Ti, from metals of Groups IVa, Va and VIa of the periodic table, or a mixture thereof.

A sintered body obtained using this mixed ceramic powder is a ceramic with excellent toughness, and this ceramic is obtained by compacting and sintering the mixed ceramic powder through typical methods.

This mixed powder may be a mixed cermet powder including: (ii) a solid-solution powder with a complete solid-solution phase including a carbide or a carbonitride of at least two metals selected, including Ti, from metals of Groups IVa, Va and VIa of the periodic table, or a mixture thereof; and (iii) a powder including a carbide or a carbonitride of at least one metal selected from metals of Groups IVa, Va and VIa of the periodic table, or a mixture thereof, and at least one metal selected from the group consisting of Ni, Co and Fe.

That is, although the solid-solution powder (ii) has no binding phase, a cermet can be fabricated using the mixed powder of the solid-solution powder (ii) without a binding phase and the powder (iii) having a binding phase, depending on the amount of a binding phase metal (Ni, Co and Fe) existing in the powder (iii).

A sintered body obtained using this mixed cermet powder is a cermet with excellent toughness, and this cermet is obtained by compacting and sintering the mixed cermet powder through typical methods.

Another cermet powder described in the embodiments includes at least a cermet powder with complete solid-solution phase. Herein, the cermet powder includes a carbide or a carbonitride of at least two metals selected, including Ti, from metals of Groups IVa, Va and VIa of the periodic table, or a mixture thereof, and at least one metal selected from the group consisting of Ni, Co and Fe.

This mixed cermet powder may include: (iii) a powder including a carbide or a carbonitride of at least one metal selected from metals of Groups IVa, Va and VIa of the periodic table, or a mixture thereof, and at least one metal selected from the group consisting of Ni, Co and Fe; and (iv) a cermet powder including a carbide or a carbonitride of at least two metals selected, including Ti, from metals of Groups IVa, Va and VIa of the periodic table, or a mixture thereof, and at least one metal selected from the group consisting of Ni, Co and Fe.

Alternatively, this mixed cermet powder may include: (i) a powder including a carbide or a carbonitride of at least one metal selected from metals of Groups IVa, Va and VIa of the periodic table, or a mixture thereof; and (iv) a cermet powder with complete cermet powder including a carbide or a carbonitride of at least two metals selected, including Ti, from metals of Groups IVa, Va and VIa of the periodic table, or a mixture thereof, and at least one metal selected from the group consisting of Ni, Co and Fe.

That is, the powder, which is mixed with the cermet powder (iv) with complete solid-solution phase to form the mixed cermet powder of the exemplary embodiment, is generally a powder corresponding to the mixed powder (iii) including a carbide or a carbonitride of at least one metal selected from metals of Groups IVa, Va and VIa of the periodic table, or a mixture thereof, and at least one metal selected from the group consisting of Ni, Co and Fe. However, the powder constituting the mixed cermet powder of the exemplary embodiment with the cermet powder (iv) may be a powder corresponding to the powder (i) including only a carbide, a carbonitride, or a mixture thereof, without a binding phase depending on the amount of the binding phases (Ni, Co and Fe) existing in the cermet powder (iv) with complete solid-solution phase.

A cermet prepared by sintering the above-described mixed cermet powders and a fabrication method thereof will be more fully described in Example 1 below.

EXAMPLE 1

As an example, anatase-$TiO_2$ of purity 99%, NiO of purity 99% (avg. particle size of 4 μm) and $WO_3$ of purity 99% (avg. particle size of 20 μm) were used.

They were mixed with carbon powder for the five target compositions as follows: (1) (Ti,W)C—Ni (including 15 wt. % of WC), (2) (Ti,W)C—Ni (including 30 wt. % of WC), (3) (Ti,W)(C,N)—Ni (including 15 wt. % of WC and C/N=2:1), (4) (Ti,W)(C,N)—Ni (including 30 wt. % of WC and C/N=3:1), and (v) (Ti,W)C (including 15 wt. % of WC).

They were ground, i.e. high-energy ball milled using a planetary mill (Fritsch Pulverisette 7). Tungsten carbide (WC) balls with 5 mm in a diameter were used. A weight ratio of the milling ball to powder was set to 40:1.

A tungsten carbide bowl was used and all milling was performed at a speed of 250 rpm for 20 hours.

FIGS. 1(a) through 1(c) are X-ray diffraction (XRD) phase analysis results of powders with complete solid-solution phase according to Example 1.

In detail, FIG. 1(a) illustrates that a solid-solution powder with complete solid-solution phase of (Ti,W)C (including 15 wt. % of WC) have been prepared from a mixture of $TiO_2$, $WO_3$ and C, FIG. 1(b) illustrates that a cermet powder with complete solid-solution phase of (Ti,W)C—Ni (including 30 wt. % of WC) have been prepared from a mixture of $TiO_2$, $WO_3$, NiO and C, and FIG. 1(c) shows that a cermet powder with complete solid-solution phase of (Ti,W)(C,N)—Ni (including 30 wt. % of WC) have been prepared from a mixture of $TiO_2$, $WO_3$, NiO and C.

As illustrated in FIG. 1(a), the solid-solution phase formed is a monolithic complete solid solution. FIGS. 1(b) and 1(c) also illustrate that Ni powders exist as being mixed with a monolithic solid-solution.

Table 1 is an analysis result of CNO element of the powders prepared on the basis of above compositions using the above-described process. As a comparison example, commercial powders with the same composition were also analyzed in the same manner.

TABLE 1

| | Composition | C | N | O |
|---|---|---|---|---|
| 15 wt. % WC | Nano (Ti,W)C—Ni* | 12.14 | 0.52 | 1.14 |
| 15 wt. % WC | Commercial TiC—WC—Ni | 14.19 | 0.00 | 0.99 |
| 30 wt. % WC | Nano (Ti,W)C—Ni** | 10.65 | 0.38 | 1.08 |
| 30 wt. % WC | Commercial TiC—WC—Ni | 12.15 | 0.00 | 0.83 |
| 15 wt. % WC | Nano (Ti,W)(C,N)—Ni* | 11.45 | 5.58 | 0.38 |
| 15 wt. % WC | Commercial Ti(C,N)—WC—Ni | 10.10 | 4.44 | 0.81 |
| 30 wt. % WC | Nano (Ti,W)(C,N)—Ni** | 10.39 | 3.66 | 0.08 |
| 30 wt. % WC | Commercial Ti(C,N)—WC—Ni | 9.00 | 3.39 | 0.83 | where the compositions marked as * were made from Ti(C,N)-15 wt. % WC—Ni as a starting composition, and the compositions marked as ** were made from Ti(C,N)-30 wt. % WC—Ni as a starting composition.

As illustrated in Table 1, nanopowders prepared are cermet powders of (Ti,W)C—Ni and (Ti,W)(C,N)—Ni with 15 and 30 wt. % of WC, and particularly, in case of (Ti,W)(C,N)—Ni, the oxygen content is lower than that of commercial powders. The solid-solution powders or the cermet powders prepared are used in such a way that they are contained in mixed ceramic powders or mixed cermet powders according to the exemplary embodiment.

Figure 2:
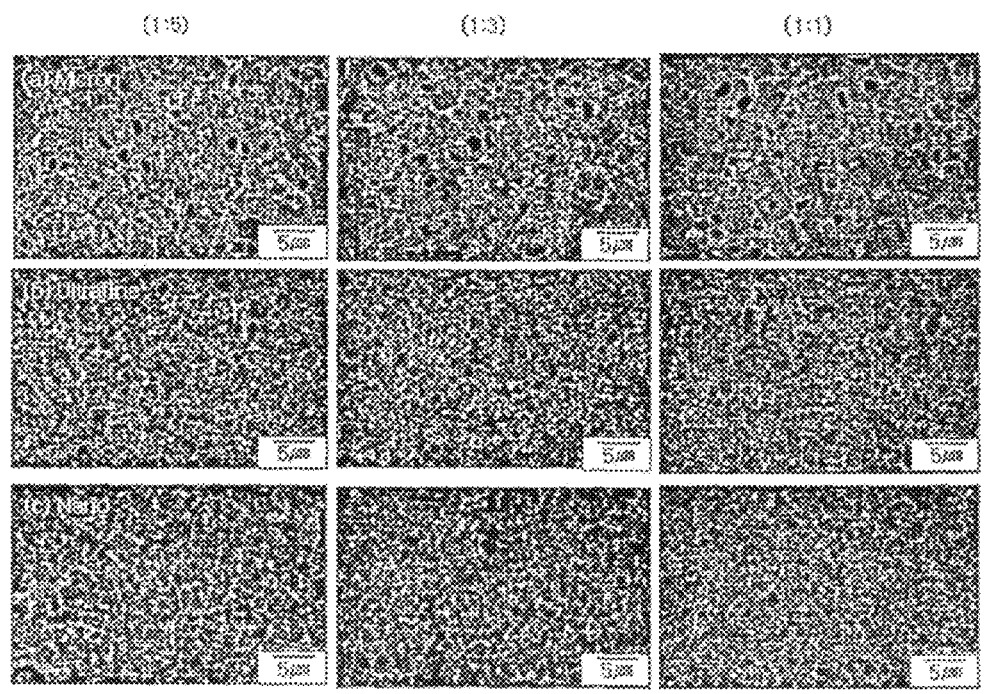
FIGS. 2(a) through 2(c) are scanning electron microscope (SEM) images illustrating microstructures of cermets obtained by sintering mixed cermet powders according to an exemplary embodiment.

FIGS. 2(a) through 2(c) are scanning electron microscope (SEM) images illustrating microstructures of cermets obtained by sintering mixed cermet powders according to an exemplary embodiment. The mixed cermet powder was fabricated by mixing the cermet powder with complete solid-solution phase of (Ti,W)C-20 wt. % Ni (including 15 wt. % of WC) prepared by the previously described method and a cermet powder of Ti(C,N)-15 wt. % WC-20 wt. % Ni prepared by general powder metallurgy (P/M). Mixing of two kinds of powders is performed for 24 hours through horizontal milling under wet conditions. After drying, the mixed powder is molded under 125 MPa and thereafter the molded powder having a disc shape (1 cm in diameter) is sintered at 1,510° C. for 1 hour in a vacuum furnace ($10^{-2}$ Torr).

In detail, FIG. 2(a) is a SEM image illustrating sintered body microstructures of mixed cermet powders in which cermet powders with complete solid-solution phase of (Ti,W)C-20 wt. % Ni (including 15 wt. % of WC) and commercial cermet powders of Ti(C,N)-15 wt. % WC-20 wt. % Ni including micro-sized carbides are mixed at a weight ratio of 1:5, 1:3, and 1:1, respectively.

FIG. 2(b) is a SEM image illustrating microstructures of sintered body microstructures of mixed cermet powders in which the cermet powders with complete solid-solution phase and commercial cermet powders including ultra-fine sized carbides are mixed at a weight ratio of 1:5, 1:3, and 1:1, respectively.

FIG. 2(c) is a SEM image illustrating microstructures of sintered body microstructures of mixed cermet powders in which the cermet powders with complete solid-solution phase and commercial cermet powders including nano-sized carbides are mixed at a weight ratio of 1:5, 1:3, and 1:1, respectively.

It can be observed from the SEM images that the amount of a rim phase increases in a core/rim structure as an additive amount of the cermet powder with complete solid-solution phase increases. Furthermore, it can also be observed that a microstructure such as a core size of TiC or Ti(C,N) can be effectively adjusted according to a size of the powder used in addition to the cermet powder with complete solid-solution phase, i.e., the commercial cermet powder of Ti(C,N)-15 wt. % WC-20 wt. % Ni.

TABLE 2

|  | (1:5) mixed powder | (1:3) mixed powder | (1:1) mixed powder | (1:0.5) mixed powder |
|---|---|---|---|---|
| Hardness (Gpa) | 14.1 | 12.3 | 12.5 | 12.7 |
| Toughness (MPam$^{1/2}$) | 9.3 | 10.4 | 11.5 | 10.9 | where (1:5) means a weight ratio of the cermet powder with complete solid-solution phase to the mixed cermet powder having commercial carbides.

Table 2 illustrates physical properties of the cermet prepared by Example 1.

As illustrated in Table 2, the prepared cermet had high sintering density and low porosity in spite of its simple composition. Furthermore, a value of $K_{IC}$ in the cermet of the exemplary embodiment had a high toughness of 9~12 MPam$^{1/2}$ whereas the commercial cermet had a toughness of 6~8 MPam$^{1/2}$. Hence, the cermet of the exemplary embodiment may be widely applied to various fields because both the increase of toughness and the decrease of hardness can be achieved together as the amount of complete solid-solution phase increases.

TABLE 3

|  | (1:5) mixed powder (spray dry) | (1:5) mixed powder (general dry) |
|---|---|---|
| Hardness (Gpa) | 14.3 | 14.1 |
| Toughness (MPam$^{1/2}$) | 12.2 | 9.3 |

As illustrated in Table 3, even in the case where the same amount of complete solid-solution phase was used, effects upon characteristics were greatly changed depending on a drying method. In particular, a superior effect can be achieved when a powder mixture is optimally molded for a subsequent sintering process using a spray drying method.

According to a mixed powder partially including a solid-solution powder with a complete solid-solution phase, a ceramic and a cermet fabricated using this mixed powder, a mixed cermet powder partially including a cermet powder with a complete solid-solution phase, a cermet fabricated using this mixed cermet powder, and fabrication methods thereof, and the toughness problem caused by high hardness of TiC or Ti(C,N) ceramic and cermet can be resolved. They can be suitably used for cutting tools and dies because the microstructure can be easily controlled.

Embodiment 2

Figure 3:
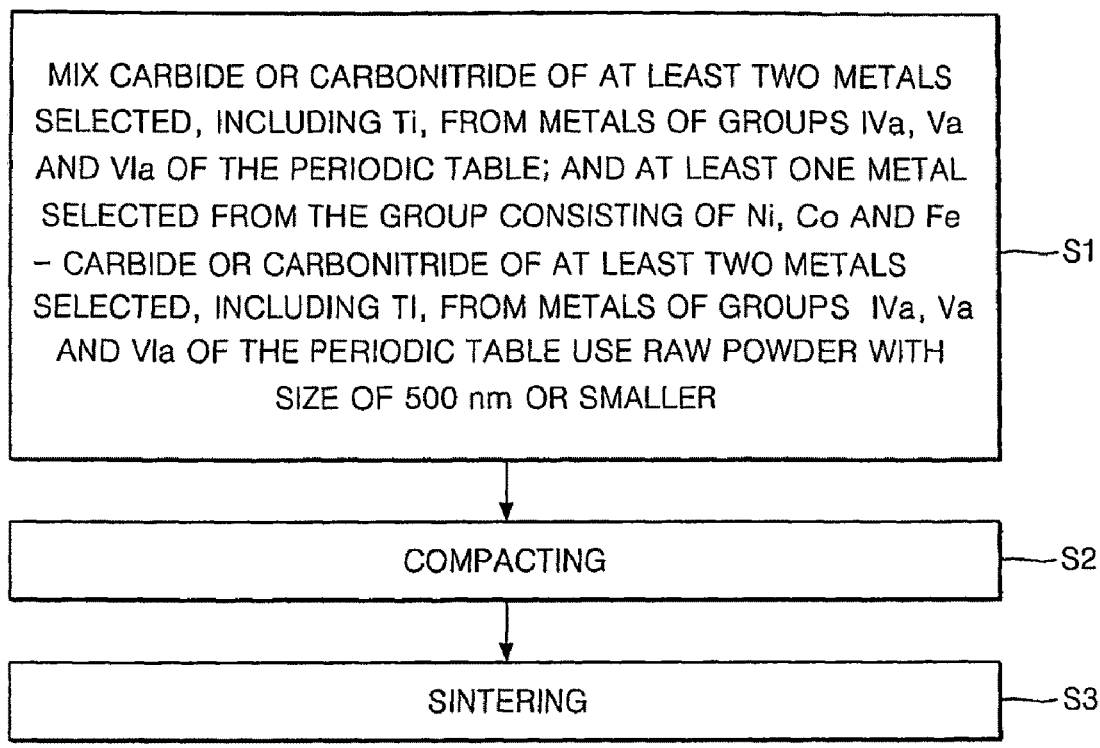
FIG. 3 is a flowchart illustrating a method of fabricating a cermet according to an exemplary embodiment.
Figure 4:
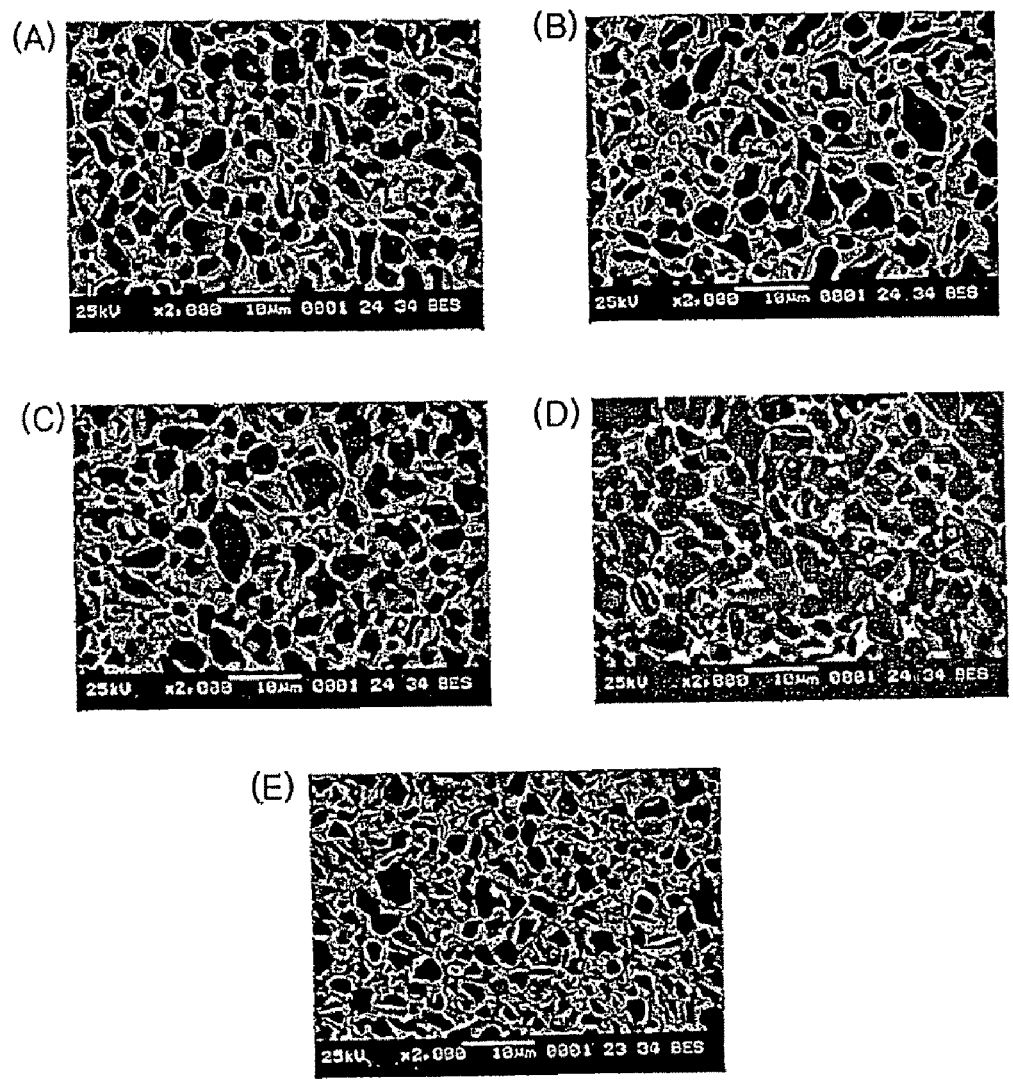
FIGS. 4(A) through 4(E) are SEM images of Ti (C,N)-xWC-20 wt. % Ni cermets prepared using micro-sized Ti(C,N) for comparison.
Figure 5:
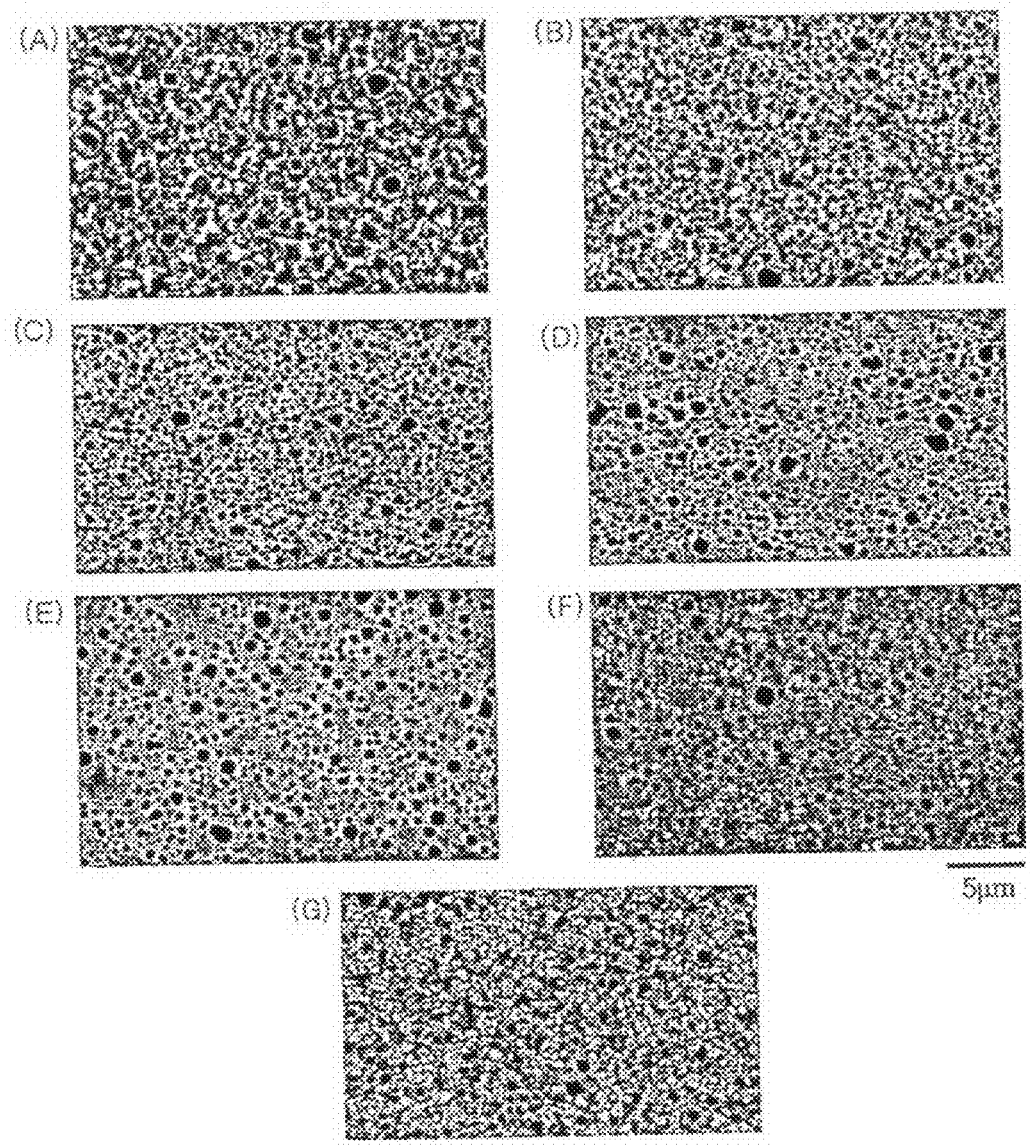
FIGS. 5(A) through 5(G) are SEM images of Ti (C,N)-xWC-20 wt. % Ni cermets prepared using ultra fine-sized Ti(C,N) for comparison.

FIG. 3 is a flowchart illustrating a method of fabricating a cermet according to an exemplary embodiment.

First, a powder mixture is prepared by mixing: a carbide or a carbonitride of at least two metals selected, including Ti, from metals of Groups IVa, Va and VIa of the periodic table; and at least one metal selected from the group consisting of Ni, Co and Fe (operation s1).

Here, a carbide or a carbonitride of at least one metal selected, including Ti, from metals of Groups IVa of the periodic table, uses a nano-sized raw material, for example, a raw powder with a size of 500 nm or smaller. The raw powder may have a size in the range of 100 nm to 200 nm. The raw powder may have a size of 100 nm or smaller. The method of fabricating the cermet may further include milling the powder mixture to reduce powder size, in which a raw material with a size of 500 nm or smaller is used.

The carbide or the carbonitride of Group IVa metals including TiC or Ti(C,N), a main raw material, is thermodynamically more stable than elements of Groups Va and VIa, so that it is not dissolved during a sintering process. Therefore, in the exemplary embodiment, the surface area is increased by reducing the size of the raw material of the Group IVa metal, thus allowing the dissolution rate to be controlled. Consequently, it is possible to obtain a microstructure including mostly complete solid-solution phases (with the exception of binding phase).

Thereafter, this powder mixture is molded (operation s2), and sintered (operation s3) to thereby obtain a sintered body.

As such, in the exemplary embodiment, as Group IVa metal uses nano-sized raw powder, it is possible to fabricate a cermet including complete solid-solution phases in a sintered body microstructure up to 70% or more in volume fraction as main particles even in the case of using typical compacting and sintering methods. In addition, as will be illustrated more fully in Example 2 below, the cermet may be fabricated such that the concentration of the Group IVa metal is higher in an external complete solid-solution phase (hereinafter, referred to as "external rim") than an internal complete solid-solution phase (hereinafter, referred to as "internal rim") according to the content of Group IVa metal.

A cermet fabricated typically is disadvantageous in that its toughness is low due to a low volume fraction of a rim phase. However, the cermet of the exemplary embodiment has a complete solid-solution phase (rim) up to 70% or more in volume fraction so that it is possible to attain high toughness characteristics.

EXAMPLE 2

As an example, Ti (C,N)-xWC-20 wt. % Ni compositions were prepared using Ti(C,N), WC and Ni with various sizes, mixed and molded using 24-hour ball mill, and were then sintered at 1,510° C. for 1 hour, as illustrated in Table 4. In the method of fabricating a cermet according to the exemplary embodiment, a cermet system is divided into a nano system (a), an ultra-fine system (b) greater than the nano system, and a micro system (c) greater than the ultra-fine system according to powder size.

TABLE 4

| | Powders | Particle size (μm) | Stoichiometry | Surface area (m²/g) | Manufacturer |
|---|---|---|---|---|---|
| (a) | Ti(C$_{0.7}$N$_{0.3}$) | 0.08 | Ti(C$_{0.66}$N$_{0.30}$O$_{0.04}$)$_{0.99}$ | 17.037 | Nanost. & Amorph. Mat |
| | WC | 0.2 | | 2.189 | OMG |
| | Ni | 0.08 | | 6.406 | Inframat Adv. Mat |
| (b) | Ti(C$_{0.7}$N$_{0.3}$) | 0.3 | Ti(C$_{0.64}$N$_{0.34}$O$_{0.02}$)$_{0.98}$ | 5.945 | Shijiazhaung High-tech |
| | WC | 0.2 | | 2.189 | OMG |
| | Ni | 4.2 | | | Novamet |
| (c) | Ti(C$_{0.7}$N$_{0.3}$) | 3-5 | Ti(C$_{0.68}$N$_{0.28}$O$_{0.01}$) | 0.896 | Kennametal |
| | WC | 1.9 | | 0.417 | H. C. Starck |
| | Ni | 4.2 | | | Novamet |

In the nano system (a), nano-sized Ti(C,N), 200 nm size WC, and nano-sized Ni were used, and the content of Ni was fixed to 20 wt. %. The size of WC was fixed to 200 nm for comparison with the ultra fine system (b). In the ultra-fine system (b), 300 nm size Ti(C,N), 200 nm size WC, and 4.2 μm size Ni were used. In the micro system (c), Ti(C,N) with a size of 3-5 μm, 1.9 μm size WC, and 4.2 μm size Ni were used.

In all the systems, the content of WC was changed from 10% to 70% by weight. Weighted powder was ball-milled for 24 hours using acetone as a medium, and the milled powder was sieved. Subsequently, pressure of 125 MPa was applied to mold the powder into the shape of a disc.

FIGS. 4(A) through 4(E) are SEM images of Ti (C,N)-xWC-20 wt. % Ni cermets prepared using micro-sized Ti(C, N) in the micro system (c). A core/rim structure having a distinct boundary between a core and a rim can be observed. In detail, FIGS. 4(A) through 4(E) illustrate SEM images of Ti(C,N)-xWC-20 wt. % Ni cermets, when x is 10, 20, 30, 40 and 50, respectively.

FIGS. 5(A) through 5(G) are SEM images of Ti(C,N)-xWC-20wt. % Ni cermets prepared using ultra fine-sized Ti(C,N) in the ultra-fine system (b). In detail, FIGS. 5(A) through 5(G) illustrate SEM images of Ti(C,N)-xWC-20 wt. % Ni cermets, when x is 10, 20, 30, 40, 50, 60 and 70, respectively. Though the size of Ti(C,N) is reduced in comparison with that of the micro system (c), it can be observed that a core/rim structure still has a distinct boundary between a core and a rim.

FIGS. 6(A) through 6(G) are SEM images of Ti(C,N)-xWC-20wt. % Ni cermets prepared using nano-sized Ti(C,N) in the nano system (a). In detail, FIGS. 6(A) through 6(G) illustrate SEM images of Ti(C,N)-xWC-20 wt. % Ni cermets, when x is 10, 20, 30, 40, 50, 60 and 70, respectively. Ti(C,N) cores shown as black color in an SEM image are not shown in every composition of FIGS. 6(A) through 6(G), and it can be observed that the microstructure is mainly divided into two kinds of rims, i.e., an internal rim and an external rim. As such, cores do not appear in every composition of the exemplary embodiment. That is, the composition includes only a complete solid-solution phase (rim) and a binding phase, and it was found out that the volume fraction of the complete solid-solution phase is 70% or more using a line intercept method with respect to the microstructure.

Figure 6:
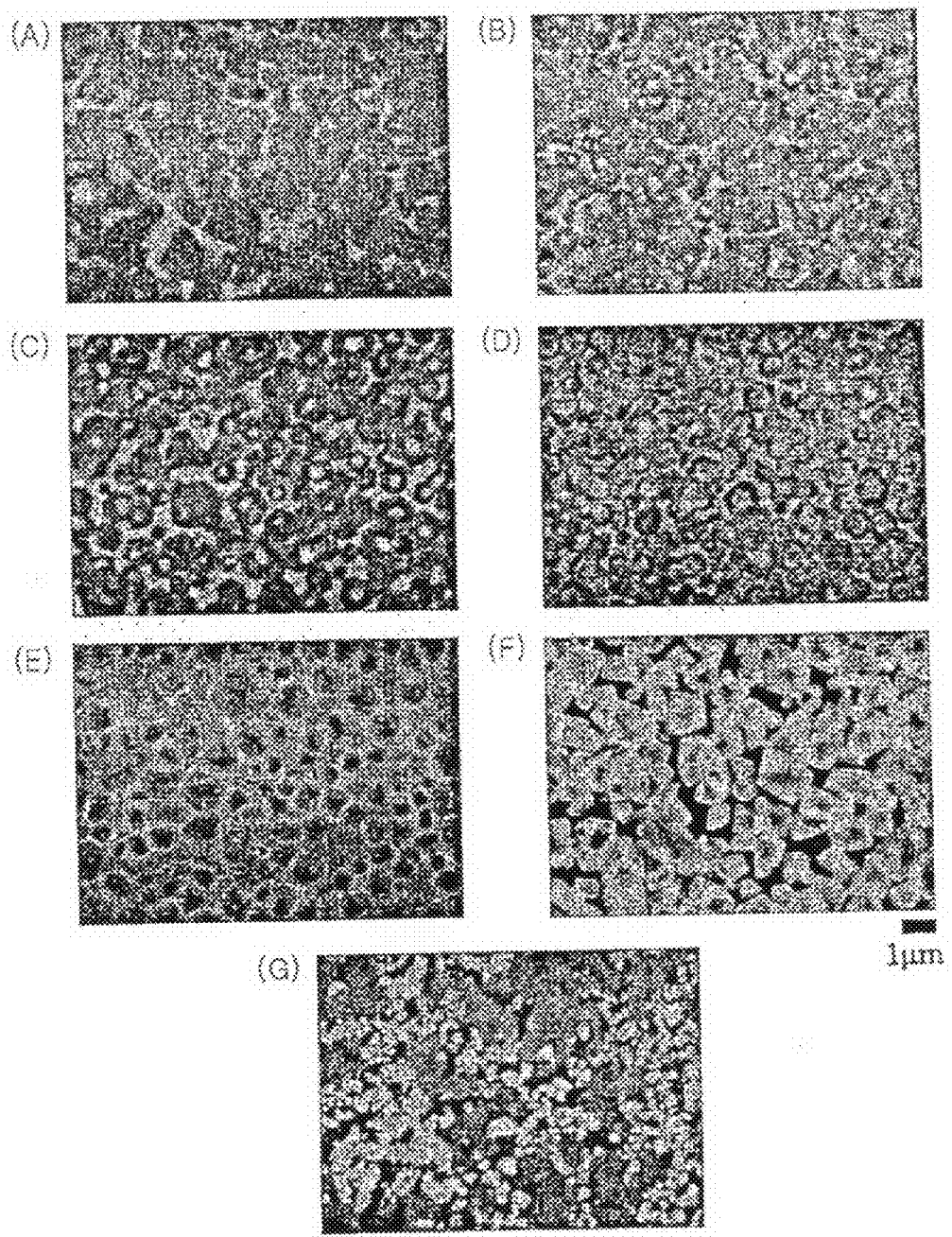
FIGS. 6(A) through 6(G) are SEM images of Ti (C,N)-xWC-20 wt. % Ni cermets prepared using nano-sized Ti(C,N) according to an exemplary embodiment.

Only one kind of a binding phase is observed in the composition of FIG. 6(A) where the content of WC is 10 wt. %, which means that the complete solid-solution phase is formed in a system where the content of WC is small. In FIG. 6(B), an internal rim of microstructure phase is observed in the composition of FIG. 6(B) where the content of WC is 20 wt. %. As the content of WC increases, the amount of the internal rim also increases as well.

All phases change in contrast as a function of the WC content. A contrast of the internal rim phase changes from bright gray to dark gray. A contrast of the external rim also changes from bright gray to ash gray as the content of WC increases. In particular, referring to FIGS. 6(D) and 6(E), contrast inversion occurs at around 40 wt. % of WC. A SEM image in backscattered electron (BSE) mode has bright contrast with respect to a heavy metal. Here, the inversion indicates W contrast inversion in a rim phase. It is known that the content of W is always higher in the internal rim than the external rim in ultra-fine and micro systems. It is considered that this inversion phenomenon of the internal and external rims in the case where WC is substantially added is unique in the nano system of the exemplary embodiment under the same sintering conditions. As such, according to the exemplary embodiment, it is possible to fabricate the composition such that concentration of Group VIa metal is higher in the external rim than the internal rim.

It has been found that a contrast of a binding phase changes with the increase of E content. When the content of WC exceeds 50 wt. % (i.e., in case of FIGS. 6(E) and 6(F)), the contrast difference between the rim and the binding phase is inverted, which means that the external rim contains W much more as the content of WC increases. When 70 wt. % of WC is added into a nano system, undissolved WC starts to appear, as illustrated in FIG. 6(G). A composition in which the undissolved WC starts to appear is higher than 60 wt. % of the ultra-fine system. This suggests that dissolution/precipitation occurring in the nano system differs from those of the ultra-fine and micro systems.

As it can be understood from the above results, when using the nano-sized Ti(C,N) according to the exemplary embodiment, it is possible to fabricate a high toughness cermet where a core does not exist in every composition and a volume fraction of a rim is 70% or greater, that is, a volume fraction of complete solid-solution phases is 70% or greater, through dissolution/precipitation which differs from those of the ultra-fine and micro systems.

Figure 7A:
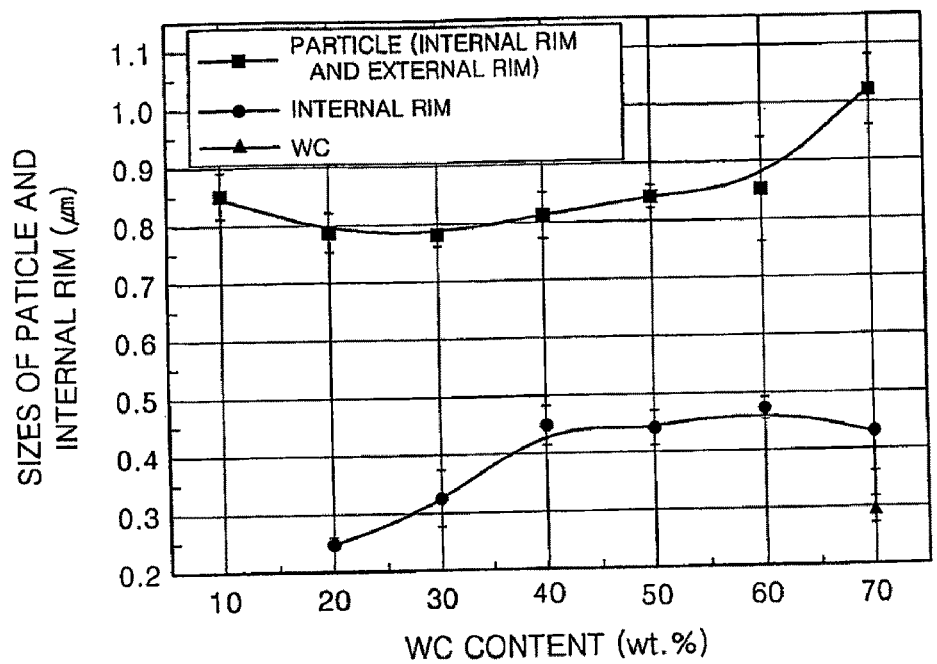
FIG. 7A is a graph illustrating a change in sizes of particles and an internal rim versus WC content in a cermet of Ti (C,N)-xWC-20 wt. % Ni according to an exemplary embodiment.

FIG. 7(A) is a graph illustrating change in sizes of particles and internal rim versus WC content in Ti(C,N)-xWC-20 wt. % Ni according to an exemplary embodiment.

Referring to FIG. 7(A), an average particle size is uniformly maintained to be 0.8-0.9 μm except for WC content of 70 wt. %. Nano-sized particles rarely exist in a microstructure in spite of using nano-sized raw powders. The size of the internal rim progressively increases as the content of WC increases. Even when 40 wt. % or more of WC is added, the internal rim retains its size. From the overall results, it can be understood that the growth of the solid-solution phase is not a function that mainly depends on WC content or composition.

Figure 7B:
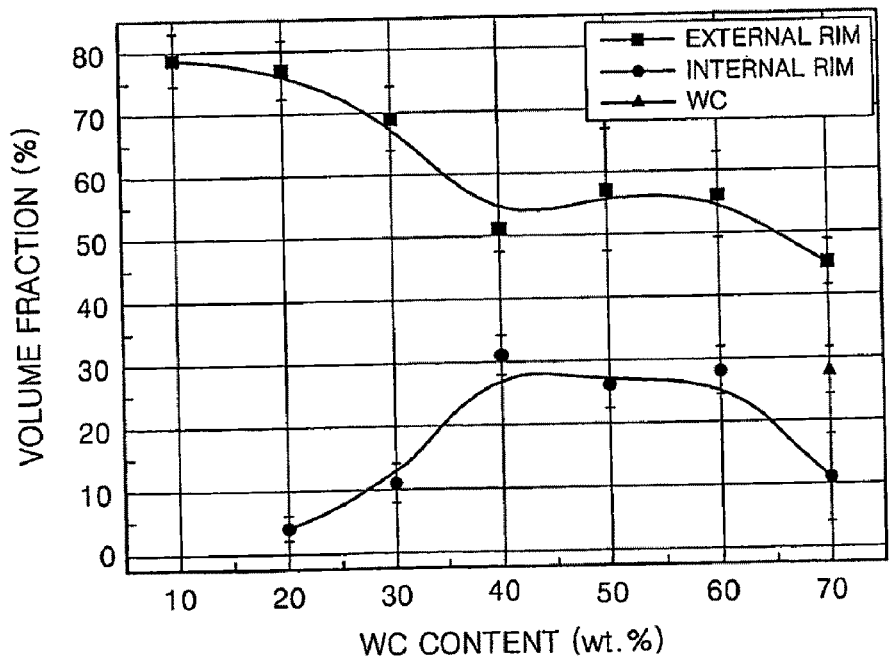
FIG. 7B is a graph illustrating a change in volume fraction of a rim versus WC content in a cermet of Ti(C,N)-xWC-20 wt. % Ni according to an exemplary embodiment.

FIG. 7(B) is a graph illustrating a change in volume fraction of a rim versus WC content in Ti(C,N)-xWC-20 wt. % Ni according to an exemplary embodiment. The change in volume fraction of the internal rim tends to be similar to change in size. This result is significantly different from the ultra-fine system where the volume fraction of the internal rim steadily increases. The effect of WC content affecting a thickness of the rim is minimal in the micro system.

Figure 8:
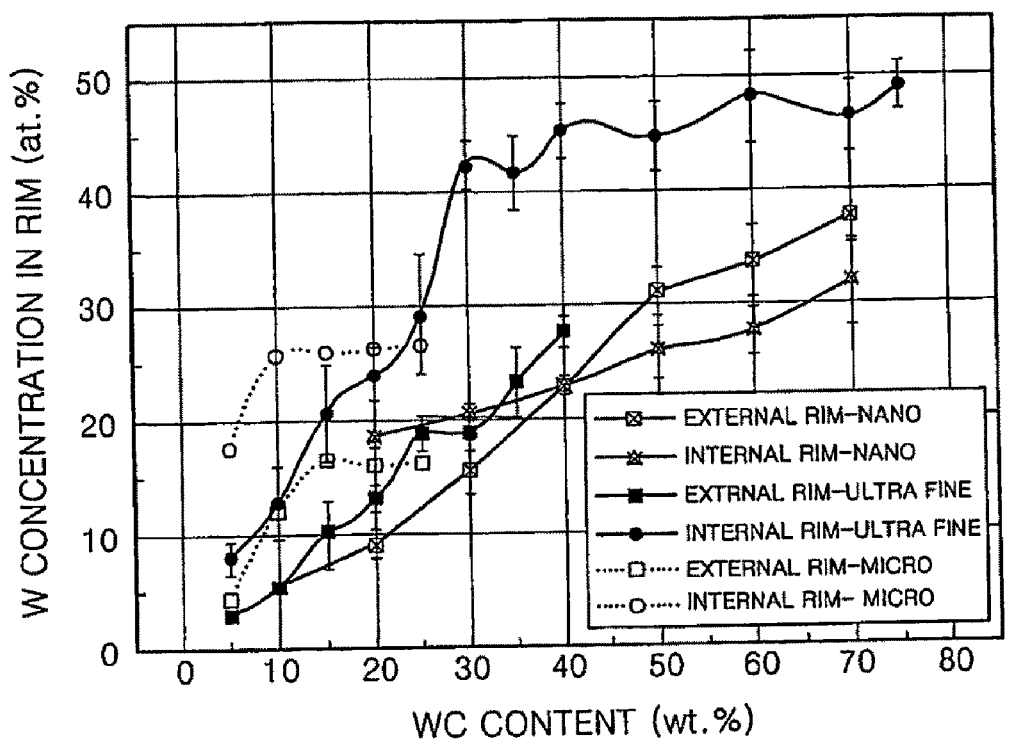
FIG. 8 is a graph illustrating composition analysis results for a core, an internal rim, an external rim, and a binding phase using a transmission electron microscopy with energy dispersive X-ray analysis (TEM/EDXA) apparatus.

A composition analysis was performed on a core, an internal rim, an external rim and a biding phase of each cermet obtained through various examples using a transmission electron microscopy with energy dispersive X-ray analysis (TEM/EDXA) apparatus. The results and comparison data are summarized in FIGS. 8.

C, N and O were not detected due to a limitation of the TEM/EDXA apparatus. As the content of WC increases, W concentration in the rim does not reach an equilibrium value but continuously increases. This differs from the micro system and the ultra-fine system having saturation points of W concentration in the rim. Besides, W concentration of the internal and external rims is lower in the nano system than the ultra-fine system. Particularly, when the content of WC exceeds 40 wt. %, the W concentration in the external rim is greater than that in the internal rim, which is apparent from contrast change.

FIGS. 9(A) through 9(G) are TEM images of samples observed in FIGS. 6(A) through 6(G). In detail, FIGS. 9(A) through 9(G) illustrate TEM results of cermets having composition of Ti(C,N)-xWC-20 wt. % Ni prepared by using nano-sized Ti(C,N) according to an exemplary embodiment, when x is 10, 20, 30, 40, 50, 60 and 70, respectively.

Figure 9:
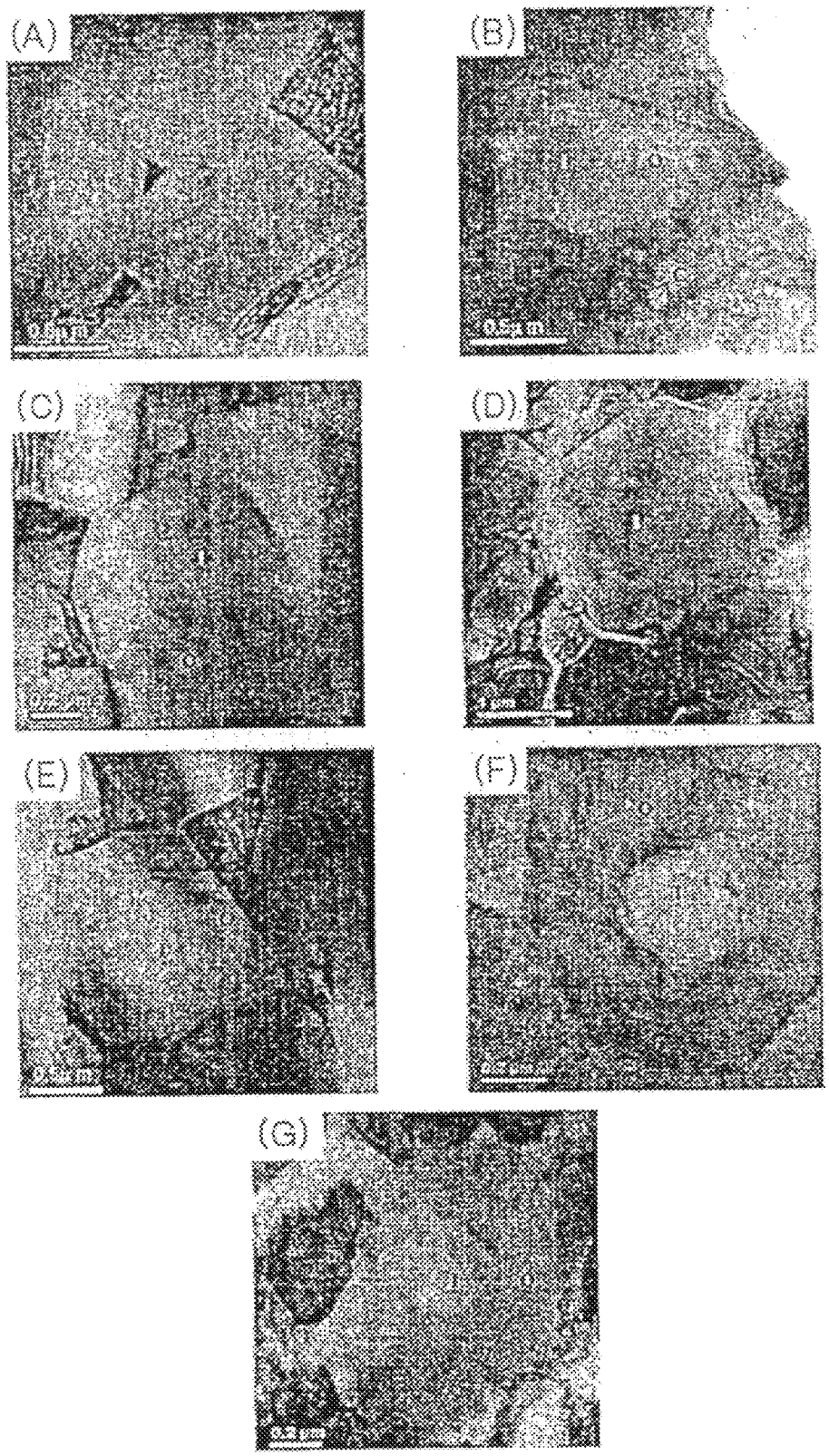
FIGS. 9(A) through 9(G) are TEM images of samples observed in FIGS. 6(A) through 6(G).

Only one kind of a hard phase is observed with a binding phase in the composition of FIG. 9(A) where the content of WC is 10 wt. %.

As the content of WC increases, the size of the external rim decreases but the size of the internal rim increases. Undissolved Ti(C,N) core is observed in the composition of FIG. 9(B), which is shown as white color in the image, meaning that some particles are not dissolved and are left remaining even though Ti(C,N) is nano-sized. Referring to FIGS. 9(D) and 9(E), it can be known that the contrast between the external rim and the internal rim is inverted near 40-50 wt. % of WC content. High concentration of a heavy metal such as W is represented as dark contrast in a TEM image. Both the external rim and the internal rim exist in every composition.

Figure 10:
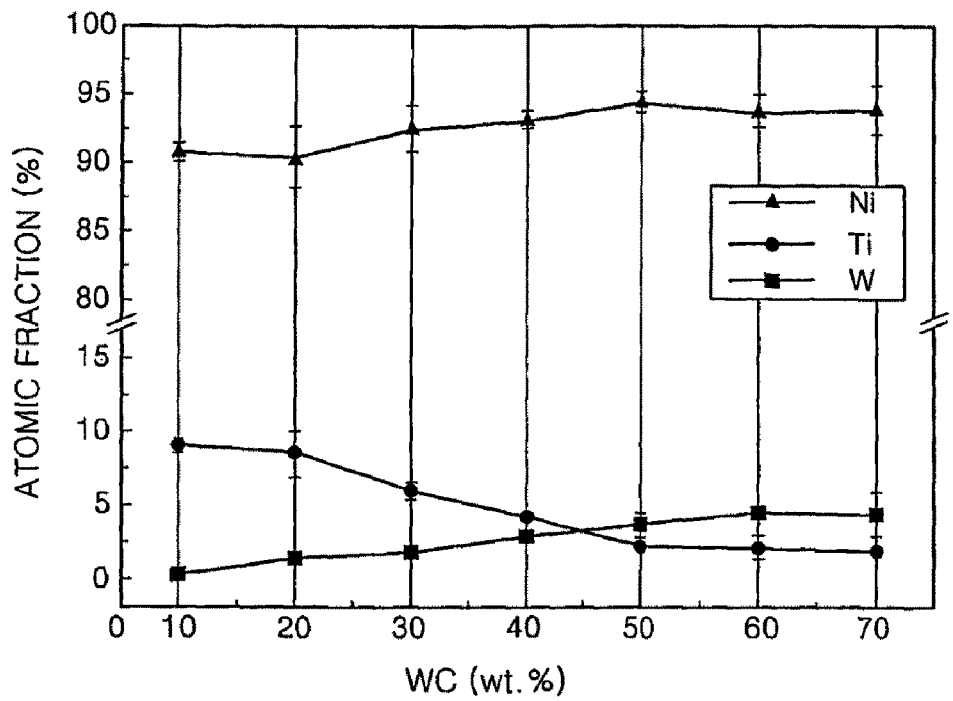
FIG. 10 is a graph illustrating Ti, W and Ni concentrations in a binding phase measured with a TEM/EDXA apparatus.

FIG. 10 is a graph illustrating Ti, W and Ni concentrations in a binding phase measured with a TEM/EDXA apparatus. It is noticeable that W reaches a maximum value and Ti reaches a minimum value when the content of WC is 60 wt. %. When the content of WC exceeds this value, concentrations of Ti and W are maintained to be 2 at. % and 4 at. %, respectively.

Figure 11:
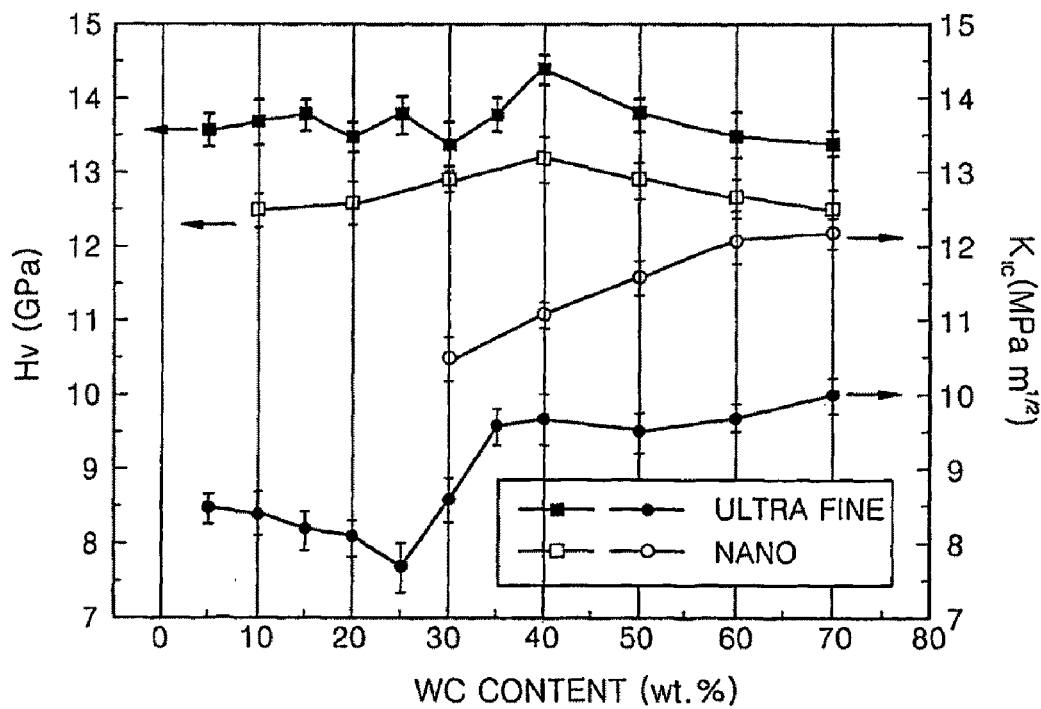
FIG. 11 is a graph illustrating hardness and toughness of Ti(C,N)-xWC-20 wt. % Ni cermet system according to the content of WC.

FIG. 11 is a graph illustrating hardness and toughness of Ti(C,N)-xWC-20 wt. % Ni system according to the WC content. The toughness increases with the increase in WC content. Sintering is difficult when small amount of WC is added, and porosity was too high to measure fracture toughness. The highest hardness is obtained at 40 wt. % of WC. Mechanical properties were much higher in the nano system than the micro system. Generally, the hardness may be reduced in the nano system but toughness becomes higher in the nano system than the ultra-fine system.

Figure 12:
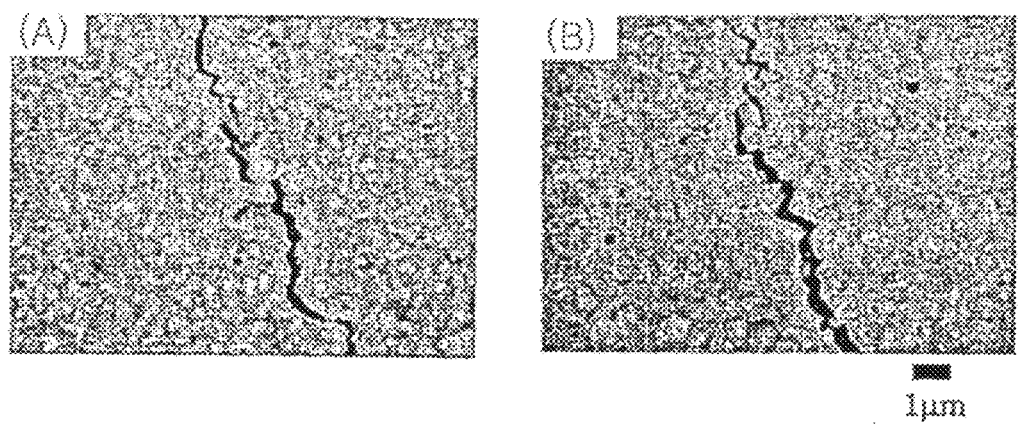
FIGS. 12(A) and 12(B) are SEM images illustrating a state that a crack propagates in cermets of Ti(C,N)-xWC-20 wt. % Ni prepared using nano-sized Ti(C,N) according to an exemplary embodiment.

FIGS. 12(A) and 12(B) are SEM images illustrating a state that a crack propagates in cermets of Ti(C,N)-xWC-20 wt. % Ni prepared using nano-sized Ti(C,N) according to an exemplary embodiment. Specifically, FIG. 12(A) shows the crack propagation in Ti(C,N)-xWC-20 wt. % Ni cermet when the content of WC is 30 wt. %, and FIG. 12(B) shows the crack propagation in Ti(C,N)-xWC-20 wt. % Ni cermet when the content of WC is 40 wt. %. The crack propagates along a solid-solution core/rim structure. In propagation of the crack, there is not a particularly preferred interface. That is, a fracture due to the penetration of particles is dominant in the nano system.

In the exemplary embodiments, the dissolution of Ti(C,N) which is thermodynamically more stable than WC, can be expedited because of using nano-sized Ti(C,N). In the nano system according to the exemplary embodiments, Ti(C,N) has a surface area 8 times greater than that of WC. As such, in a cermet obtained by sintering a cermet powder including a nano titanium carbide and a titanium carbonitride and a fabrication method thereof according to the exemplary embodiment, it is possible to improve the low toughness problem due to the high hardness of TiC or Ti(C,N)-based cermet and to control microstructures effectively. Therefore, the cermet and the fabrication method thereof are adapted for cutting tools and dies.

Meanwhile, al though only the compositions including Ti(C,N) and WC have been described in the Examples, it will be obvious to a person having ordinary skill in the art from the foregoing that carbides of other metals can be fabricated into cermets mainly having complete solid-solution phases using nano-sized powders.

Although a ceramic powder, a ceramic obtained by sintering the ceramic powder, cermet powder, a cermet obtained by sintering the cermet powder, and a fabrication method thereof, have been described with reference to the specific embodiments, they are not limited thereto. Therefore, it will be readily understood by those skilled in the art that various modifications and changes can be made thereto without departing from the spirit and scope of the present invention defined by the appended claims.

The invention claimed is:

1. A mixed cermet powder comprising at least a cermet powder with complete solid-solution phase, the cermet powder comprising:
(i) a powder comprising a carbide or a carhonitride of at least one element selected from metals of Groups IVa, Va and VIa of the periodic table, or a mixture thereof, and at least one metal selected from the group consisting of Ni, Co and Fe, and
(ii) a complete solid-solution powder comprising a carbide or a carhonitride of at least two metals selected, including Ti, from metals of Groups IVa, Va and Via of the periodic table, or a mixture thereof, and
at least one metal selected from the group consisting of Ni, Co and Fe.

2. The mixed cermet powder of claim 1, wherein the cermet powder with a complete solid-solution phase is prepared by reducing and carburizing or reducing, carburizing and nitriding a metal oxide as a raw material.

3. A cermet fabricated by sintering the mixed cermet powder of claim 1.

4. A sintered cermet of core/rim structure, comprising:
a carbide or a carbonitride of at least two metals selected, including Ti from metals of Groups IVa, Va and Via of the periodic table, or a mixture thereof; and
at least one metal selected from the group consisting of Ni, Co and Fe, wherein the core/rim structure is configured such that a core material is surrounded by a rim microstructure that includes an inner rim and outer rim, and a volume fraction of inner and outer rim solid-solution phases in a microstructure of the sintered cermet is 70% or greater as main particles.

5. The sintered cermet of claim 4, wherein a concentration of Via Group metal is higher in the outer rim solid-solution phase than the inner rim solid-solution phase.

6. A method of fabricating a cermet, the method comprising:
- mixing (i) a powder comprising a carbide or a carhonitride of at least one element selected from metals of Groups IVa, Va and Via of the periodic table, or a mixture thereof, and at least one metal selected from the group consisting of Ni, Co and Fe, and (ii) a cermet powder with complete solid-solution phase comprising a carbide or a carbonitride of at least two metals selected, including Ti, from metals of Groups Wa, Va and Via of the periodic table, or a mixture thereof, and at least one metal selected from the group consisting of Ni, Co and Fe; and
- compacting and sintering the mixed powder,
- wherein the cermet powder with a complete solid-solution phase is prepared by reducing and carburizing or reducing, carburizing and nitriding a metal oxide as raw material.

* * * * *